(12) United States Patent
Hokkanen et al.

(10) Patent No.: US 10,329,740 B2
(45) Date of Patent: Jun. 25, 2019

(54) EARTH MOVING MACHINE, RANGE FINDER ARRANGEMENT AND METHOD FOR 3D SCANNING

(71) Applicant: Novatron Oy, Pirkkala (FI)

(72) Inventors: Visa Hokkanen, Ylöjärvi (FI); Jukka Tervahauta, Tampere (FI); Mikko Vesanen, Ylöjärvi (FI)

(73) Assignee: Novatron Oy, Pirkkala (FI)

( * ) Notice: Subject to any disclaimer, the term of this patent is extended or adjusted under 35 U.S.C. 154(b) by 18 days.

(21) Appl. No.: 15/868,410

(22) Filed: Jan. 11, 2018

(65) Prior Publication Data

US 2018/0202132 A1 Jul. 19, 2018

(30) Foreign Application Priority Data

Jan. 18, 2017 (FI) .................................. 20175035

(51) Int. Cl.
*E02F 9/26* (2006.01)
*G01S 17/42* (2006.01)
(Continued)

(52) U.S. Cl.
CPC .............. *E02F 9/264* (2013.01); *E02F 3/842* (2013.01); *E02F 9/26* (2013.01); *E02F 9/261* (2013.01);
(Continued)

(58) Field of Classification Search
None
See application file for complete search history.

(56) References Cited

U.S. PATENT DOCUMENTS

| | | | |
|---|---|---|---|
| 6,717,654 B1 * | 4/2004 | Rajchel | F41G 3/065 356/141.1 |
| 2003/0137646 A1 | 7/2003 | Hoffman et al. | |
| 2007/0181810 A1 | 8/2007 | Tan | |
| 2008/0005938 A1 | 1/2008 | Aebischer et al. | |
| 2009/0112472 A1 | 4/2009 | Montgomery | |
| 2013/0293408 A1 * | 11/2013 | Underwood | G01S 7/412 342/146 |

(Continued)

FOREIGN PATENT DOCUMENTS

| | | |
|---|---|---|
| JP | 2016008484 A | 1/2016 |
| WO | WO2013040274 A2 | 3/2013 |

(Continued)

OTHER PUBLICATIONS

Search Report for corresponding Finnish Application No. 20175035, 1 page, dated Aug. 18, 2017.
(Continued)

Primary Examiner — Richard M Camby
(74) Attorney, Agent, or Firm — FisherBroyles, LLP

(57) ABSTRACT

A mobile earth moving machine includes a carrier, at least one machine element movable relative to the carrier, a positioning system for determining 3D position and orientation data of the earth moving machine, at least one sensing device for determining position and orientation data of the movable machine element, at least one range finder device for detecting at least one object in a field of the range finder device and providing point cloud output of the object, and at least one control unit configured to receive and process the produced data. The range finder device is a solid-state device without internal movable mechanical elements, whereby the device is without internal scanning equipment. The range finder device is arranged on the movable machine element and is configured to be moved together with the movable machine element.

20 Claims, 2 Drawing Sheets

(51) Int. Cl.
  *E02F 3/84*   (2006.01)
  *G01S 17/02*  (2006.01)
  *G01S 17/89*  (2006.01)
  *G01S 7/295*  (2006.01)
  *G01S 13/42*  (2006.01)
  *G01S 13/86*  (2006.01)
  *G01S 13/89*  (2006.01)
  *E02F 3/32*   (2006.01)

(52) U.S. Cl.
  CPC ............ *G01S 7/2955* (2013.01); *G01S 13/42* (2013.01); *G01S 13/86* (2013.01); *G01S 13/89* (2013.01); *G01S 17/023* (2013.01); *G01S 17/42* (2013.01); *G01S 17/89* (2013.01); *E02F 3/32* (2013.01)

(56) References Cited

U.S. PATENT DOCUMENTS

| | | |
|---|---|---|
| 2016/0104289 A1 | 4/2016 | Chang et al. |
| 2016/0154094 A1 | 6/2016 | Ishimaru et al. |
| 2017/0002546 A1 | 1/2017 | Fletcher et al. |

FOREIGN PATENT DOCUMENTS

| | | |
|---|---|---|
| WO | 2013/181621 A1 | 12/2013 |
| WO | 2015/041689 A1 | 3/2018 |

OTHER PUBLICATIONS

European Search Report for Application No. EP 18 15 1554 dated May 9, 2018.

\* cited by examiner

EARTH MOVING MACHINE, RANGE FINDER ARRANGEMENT AND METHOD FOR 3D SCANNING

CROSS-REFERENCE TO RELATED APPLICATION

This application claims benefit to Finnish Application No. 20175035, filed Jan. 18, 2017, which is incorporated by reference herein in its entirety.

BACKGROUND

Field

The invention relates to an earth moving machine.
The invention further relates to a range finder arrangement.
The invention further relates to a method for 3D scanning.

Description of the Related Art

Document US 2016/0104289 A1 discloses a work machine on a worksite having a range map generation system. Document WO 2015/041689 A1 discloses a method for determining a position of a machine in a worksite. The method comprises determining input data associated with a Lidar survey, by a Lidar unit on the machine at the position in the worksite.

SUMMARY

An object of the invention is to provide a new earth moving machine, a new range finder arrangement and a new method for 3D scanning.

The invention is characterized by the features of the independent claims. Embodiments of the invention are disclosed in the dependent claims.

In the presented solution a mobile earth moving machine comprises a carrier; at least one machine element movable relative to the carrier; a positioning system for determining 3D position and orientation data of the earth moving machine; at least one sensing device for determining position and orientation data of the movable machine element; at least one range finder device for detecting at least one object in a field of the range finder device and providing point cloud output of the object; and at least one control unit configured to receive and process the produced data. The range finder device is a solid-state device without internal movable mechanical elements, whereby the device is without internal scanning equipment; the range finder device is arranged on the movable machine element and is configured to be moved together with the movable machine element; the range finder device is configured to generate the point cloud output based on time-of-flight of signals transmitted by at least one transmitting unit and reflecting signals received by at least one receiving unit comprising at least one detector; and the control unit is configured to determine position and orientation of the range finder device and to provide the point cloud in response to the input data. The range finder device is durable and inexpensive. The movable machine element provides enlarged degree of freedom for the movement of the range finder device thereby providing an expanded angle of view and wide scanning beam.

According to an embodiment the control unit is configured to determine 3D position and orientation of the range finder device and to provide the point cloud with 3D coordinates in response to the input data.

According to an embodiment the range finder device is arranged to the movable machine element at a known location on the movable machine element; the location of the range finder device and a kinematic model of the movable machine element are input to the control unit; and the control unit is configured to calculate the position and orientation of the range finder device in response to the input data. In this embodiment the 3D positioning system is arranged separately relative to the range finder device.

According to an embodiment the range finder device comprises positioning means for determining 3D position and orientation of the range finder device.

According to an embodiment the receiving unit of the range finder device comprises at least one single photon detector for receiving the reflecting signals.

According to an embodiment the receiver unit comprises one or more time-gated single photon avalanche detector elements.

According to an embodiment the receiving unit comprises at least one detector element arranged to form an array of n*m, wherein n and m can be any number.

According to an embodiment the array of detector elements of the receiver unit comprise a matrix with several elements arranged in n rows and m columns.

According to an embodiment the array of detector elements of the receiver unit comprise a row with several elements. Thereby, the range finder may have horizontal bar-like configuration.

According to an embodiment the array of detector elements of the receiver unit comprise a column with several elements. Thereby, the range finder may have vertical bar-like configuration.

According to an embodiment the range finder device comprises one single detector element, whereby the receiver unit has point form configuration.

According to an embodiment the at least one machine element is a boom; and the at least one range finder is arranged to the boom, whereby the at least one range finder is moved together with the boom.

According to an embodiment the boom is provided with at least two range finder devices arranged to different locations on the boom and thereby have different angles of view.

According to an embodiment the boom is articulated and comprises two or more boom parts and joints between them; and at least two range finder devices are arranged on separate boom parts.

According to an embodiment a distal end portion of the boom is provided with at least one working tool; and the at least one range finder device is directed to produce point cloud data on the working tool.

According to an embodiment the earth moving machine is an excavator comprising a boom and a bucket at a free end of the boom; and the at least one range finder device is directed to produce point cloud data on the bucket.

According to an embodiment the at least one machine element is a bulldozer blade; at least one range finder is arranged to the blade or to supporting elements of the blade for producing point cloud data on the blade. Alternatively, or in addition to, the scanning data comprises data on topography of the ground in front of the blade, or processed material facing the frontal face of the blade during the operation.

According to an embodiment the at least one machine element is a control cabin provided with a moving arrangement allowing vertical position of the control cabin to be adjusted relative to the carrier; and the at least one range finder device is configured to produce cloud data on the vertical position of the control cabin.

According to an embodiment the range finder device is a laser range finder device, wherein the transmitting unit comprises at least one laser transmitter.

According to an embodiment the laser range finder comprises at least one laser light sources for producing a laser beam, which is directed at desired point at a work site. The device comprises at least one detector device that receive the laser beams after reflection off the target point of the work site. Based on the time between generating the laser beam and receiving, the control unit may determine a distance between the target point and the range finder device. Thus, the distance measurement is based on time-of-flight measurement principle. On the basis of the distance measurements 3D point cloud data is generated of part of the work site that is detected by the range finder device. Each data point of the 3D point cloud includes a distance from the range finder device to the detected point of the work site.

According to an embodiment the range finder device is a LiDAR instrument. LiDAR is a laser radar device, which uses ultraviolet, visible, or near infrared light from lasers.

According to an embodiment the range finder device is a radar instrument based on use of radio waves.

According to an embodiment the range finder device is a sound based time-of-flight camera or image sensor.

According to an embodiment the positioning system for determining 3D position and orientation data of the earth moving machine comprises a satellite-based positioning system (GNSS).

According to an embodiment the positioning system for determining 3D position and orientation data on the earth moving machine comprises a total station.

According to an embodiment the positioning system for determining 3D position and orientation data on the earth moving machine comprises an SLAM system (simultaneous localization and mapping). The SLAM system is configured to produce point cloud of the surrounding of the earth moving machine at an initial location and is configured to create a map of the surrounding. The system may simultaneously use the created map to determine its own location within that space. The SLAM system may be used to secure that primary position and orientation data produced by means of another system is reliable by comparing the primary position and orientation data to the created map.

According to an embodiment the at least one sensing device for determining position and orientation of the movable machine element comprises at least one Inertia Measurement Unit (IMU) for producing data on orientation; and the control unit is configured to determine orientation of the range finder device in response to the data received from the Inertial Measurement Unit.

According to an embodiment the range finder device comprises the IMU.

According to an embodiment the IMU comprises one or more devices which provide measurement of angular position, rates or acceleration. The IMU may comprise an accelerometer, a gyroscope and/or an inclinometer.

According to an embodiment one or more sensing devices are configured to monitor joints or moving actuators of the movable machine element, and the control unit is configured to calculate the position and orientation in response to the monitoring. Thus, the sensing device may be a linear movement sensor or a rotary encoder, for example.

According to an embodiment a range finder arrangement of an earth-moving machine comprises: at least one range finder device for providing scanning data comprising point cloud of at least one detected object; means for determining 3D position and orientation of the arrangement; at least one control unit configured to receive the detected data and process the received data; and the range finder device is a solid-state device without internal movable mechanical elements; the range finder device is configured to generate the point cloud based on time-of-flight of signals transmitted by a transmitting unit and reflecting signals received by a receiving unit comprising at least one detector; and the control unit is configured to determine 3D position and orientation of the range finder device and to provide the point cloud with 3D coordinates in response to the input data.

According to an embodiment a method for 3D scanning at a work site of an earth moving machine, wherein the earth moving machine comprises a carrier and at least one machine element movable relative to the carrier, comprises: producing scanning data of the surrounding of the earth moving machine by means of at least one range finder device arranged on the earth moving machine, wherein the scanned data comprises at least one point cloud of at least object detected in a field of the range finder device; determining 3D position and orientation data on the earth moving machine at the work site; inputting the produced scanned data and the determined position and orientation data to at least one control unit and calculating three-dimensional coordinates for the at least one target point of the produced scanned data; executing the scanning by means of at least one range finder device being a solid-state device without internal movable mechanical elements and provided with a limited angle of view; expanding the angle of view of the at least one range finder device being arranged on the movable machine element by moving the range finder device by means of the movable machine element; determining distance between the range finder device and at least one object by means of time of flight measurement, and inputting the data to the control unit; determining 3D position and orientation of the range finder device, and inputting the data to the control unit; and calculating three-dimensional coordinates for the point cloud in response to the input data.

According to an embodiment the system is configured to execute surveying and to collect information relating to the environment where the earth moving machine is operating. The system may collect information relating to a surface over which the earth moving machine is moving. Thus, the system may determine ground surface, ground level and other topographic features of the ground of the work site. Topography of ground surface in front of the earth moving tool is also useful information.

According to an embodiment the system is configured to execute surveying of the environment where the earth moving machine is operating, and is configured to update a pre-designed or previous three dimensional environmental model created of the work site.

According to an embodiment the system is configured to execute surveying of the environment where the earth moving machine is operating, and is configured to determine surface profiles of the environment. The system may be utilized to execute periodic scanning of the work site and may compare gathered surface data to the previous point cloud output. The control unit may calculate volume of the removed or filled material and surface changes at the operated areas in response to the comparison. The system may also update the production or terrain model and map of the work site. The system may determine changes in surface profiles of the work site and the operator may be able to view live cut/fill volumes and surface changes inside the control cabin. The created point clouds may be transformed into 3D models for volume calculations and terrain models. Further, the created and updated 3D models and maps may be shared with two or more earth moving machines operating at the same work site, whereby collaborated 3D models and maps may be used. Further, the data may be used to automatically monitor and record the realized measures executed at the work site.

According to an embodiment the system is configured to determining position and orientation of a working tool of the earth moving machine. Further, the determined position and orientation data may be compared to position and orientation data gathered from one or more sensing devices arranged on the boom. The boom sensors may be calibrated on the basis of the comparison data. The system may also be used for detecting possible failures in the primary sensing means of the instrumented boom.

According to an embodiment one or more range finder devices are configured to scan a bucket or a transport platform and material loaded therein. Based on the scanned data volume and centre of gravity of the loaded material may be determined. The determined data may be used in weighing the loaded material and for determining the caused loading to the machine, for example.

According to an embodiment the system is configured to generate a tree dimensional model of one or more machine elements or working tools. Thereby, the bucket, the transport platform or the boom may be modelled. The generated model may be compared to a previously created, or to an initial model made for manufacture of the component, and deviations between the models are being detected. Thereby, wear, failures and deformations of the component can be noted. The system may provide information for a condition monitoring system.

According to an embodiment the system is configured to determine where the potential obstacles exist in the environment and where the earth moving machine is in relation to the detected potential obstacles. Thus, the control system of the machine may utilize the point cloud data in obstacle detection and avoidance. The point cloud data may also be used for access control and for creating safety zones around the machine.

According to an embodiment the system may determine linear and rotational velocities of the earth moving machine on the basis of the generated point cloud data. Thus, the point cloud data may be used for odometry, wherein change in position over time is determined. The earth moving machine may comprise one or more disclosed range finder devices arranged to detect movements of one or more moving means, such as tracks or wheels, of the earth moving machine. Travelled distance and speed may be measured based on the created point cloud data.

BRIEF DESCRIPTION OF THE DRAWINGS

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION

Figure 1:
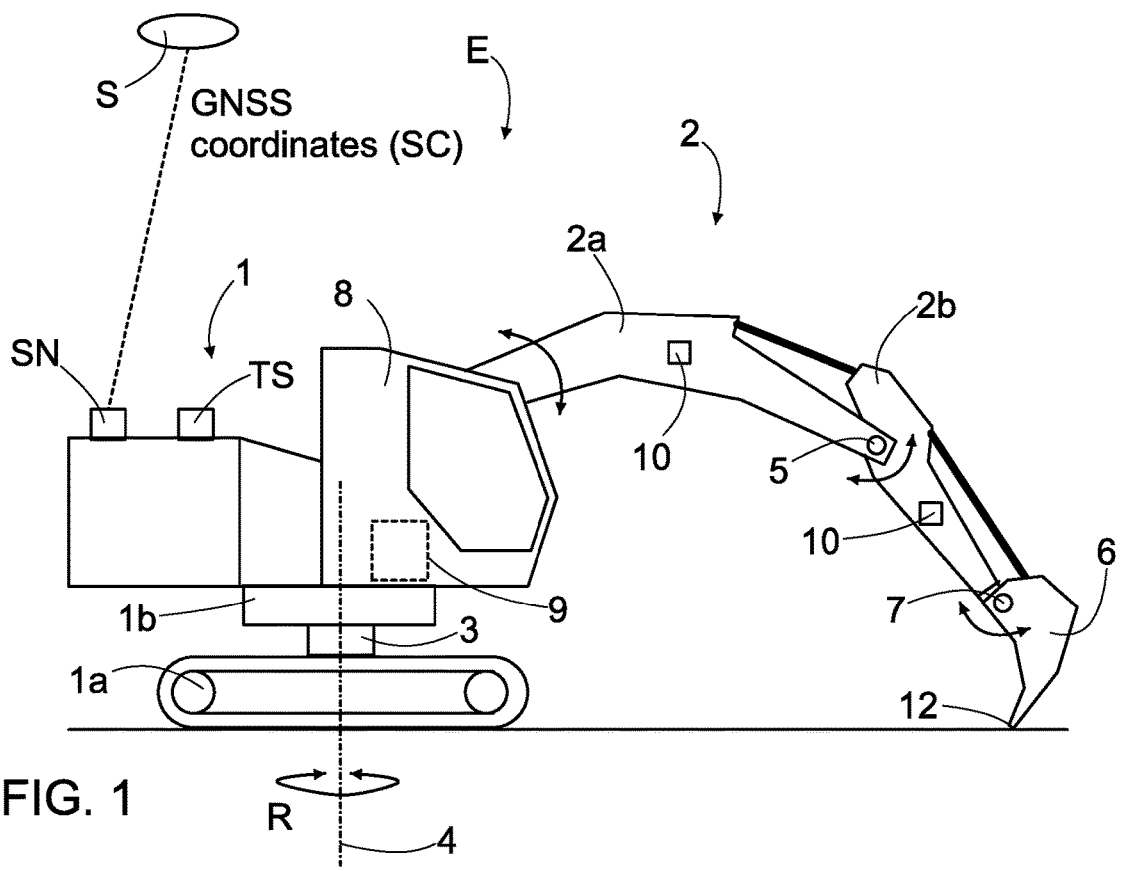
FIG. 1 is a schematic side view of an excavating machine provided with a range finder device.

FIG. 1 shows an excavator E comprising a movable carrier 1 on which a boom 2 is arranged. The excavator is one example of a mobile earth moving machine. The carrier 1 may comprise an under carrier 1a and an upper carrier 1b. The upper carrier 1b may be connected to the under carrier 1a by means of a rotating axle 3. The upper carrier 1b may be rotated R around a rotating axis 4 of the rotating axle 3. The boom 2 is arranged to turn together with the upper carrier 1b. The boom 2 may comprise a first boom part 2a and a second boom part 2b. The first boom part may be connected to the carriage 1 by means of first joint, which is not shown. The second boom part 2b may be connected to the first boom part 2a by means of a second joint 5. At a distal end of the second boom part 2b is a working tool, in this case a bucket 6, and between the bucket 6 and the second boom part 2b may be a third joint 7. In connection with the third joint 7 may also be joints or mechanisms allowing the bucked to be tilted in a sideward direction.

On the carrier 1 is a control cabin 8 for an operator. The control cabin 8 may be provided with a moving arrangement allowing vertical position of the control cabin 8 to be adjusted relative to the carrier 1.

The excavator E is provided with a range finder arrangement comprising one or more control units 9 and one or more range finder devices 10. The range finder device 10 may be arranged to the boom 2, whereby the range finder device 10 is moved together with the boom 2. The boom 2 may be provided with at least two range finder devices 10 arranged to different locations on the boom 2 and thereby having different angles of view. It is also possible to arrange one range finder device 10 to the first boom part 2a and another range finder device 10 to the second boom part 2b. The boom 2 or each boom part 2a and 2b also comprise at least one sensing device 14 for determining position and orientation data of the boom 2 or boom part 2a and 2b. Also the range finder device 10 may comprise the sensing device 14.

The excavator E may also be provided with a GNSS satellite positioning system, comprising one or more satellite receiving devices SN for receiving signals from satellites S. The receiving device SN may be placed on the carrier 1 and the control unit may calculate position of the excavator E on the basis of the received satellite based position data. Alternatively, the excavator E may be equipped with another onboard position measuring device, such as a total station TS.

The data of the position measuring device, the sensing device 14 and range finder device 10 are transmitted to the control unit 9. The control unit 9 processes the data and provides point cloud output of an object detected by the range finder device 10.

Figure 2:
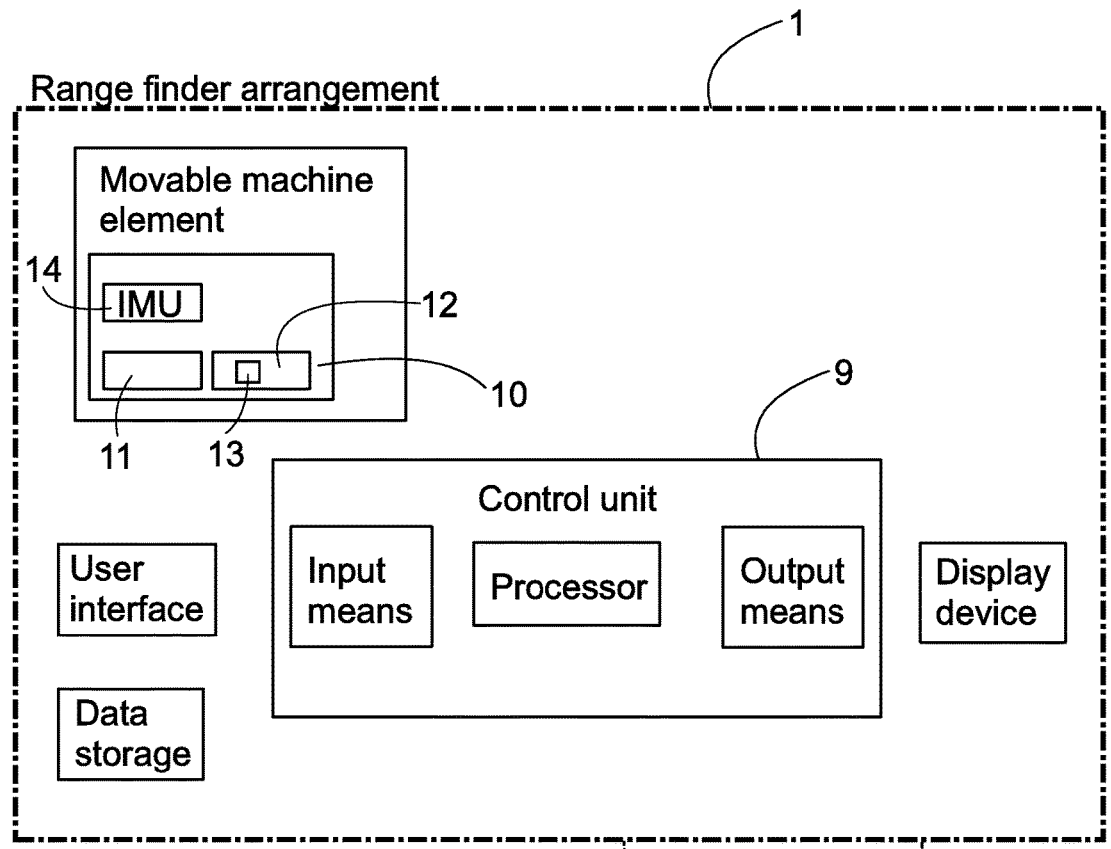
FIG. 2 shows schematically some components of the range finder arrangement.
Figure 2:
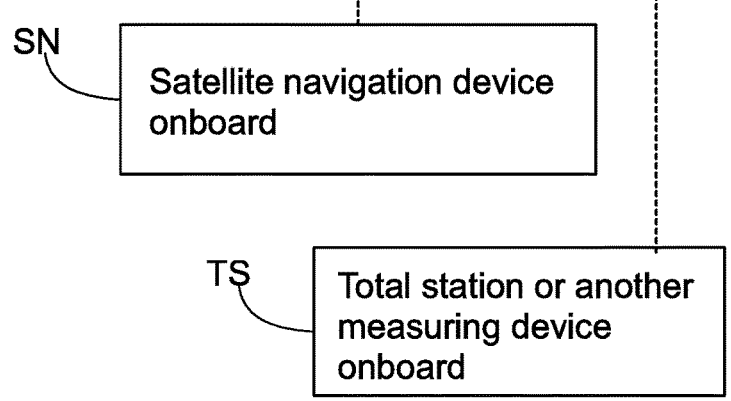

FIG. 2 discloses some components and features of the disclosed range finder arrangement. These issues have already been disclosed above in this application. The range finder device 10 may comprise the sensing device 14. The sensing device 14 may comprise at least one Inertia Measurement Unit (IMU) for producing data on orientation. The range finder device 10 comprises a transmitting unit 11 transmitting time-of-flight signals and a receiving unit 12 comprising at least one detector 13 receiving reflecting signals.

It will be obvious to a person skilled in the art that, as technology advances, the inventive concept can be implemented in various ways. The invention and its embodiments are not limited to the examples described above but may vary within the scope of the claims.

What is claimed is:

1. A mobile earth moving machine comprising:
    a carrier;
    at least one machine element movable relative to the carrier;
    a positioning system for determining 3D position and orientation data of the earth moving machine;
    at least one sensing device for determining position and orientation data of the movable machine element;
    at least one range finder device for detecting at least one object in a field of the range finder device and providing point cloud output of the object; and
    at least one control unit configured to receive and process the produced data,
    wherein the range finder device is a solid-state device without internal movable mechanical elements, whereby the device is without internal scanning equipment,
    the range finder device is arranged on the movable machine element and is configured to be moved together with the movable machine element,
    the range finder device is configured to generate the point cloud output based on time-of-flight of signals transmitted by at least one transmitting unit and reflecting signals received by at least one receiving unit comprising at least one detector, and
    the control unit is configured to determine position and orientation of the range finder device and to provide the point cloud in response to the input data.

2. The earth moving machine as claimed in claim 1, wherein
    the control unit is configured to determine 3D position and orientation of the range finder device and to provide the point cloud with 3D coordinates in response to the input data.

3. The earth moving machine as claimed in claim 1, wherein
    the receiving unit comprises at least one detector element arranged to form an array of n*m, wherein n and m can be any number.

4. The earth moving machine as claimed in claim 2, wherein
    the receiving unit comprises at least one detector element arranged to form an array of n*m, wherein n and m can be any number.

5. The earth moving machine as claimed in claim 1, wherein
    the at least one machine element is a boom, and
    the at least one range finder device is arranged to the boom, whereby the at least one range finder device is moved together with the boom.

6. The earth moving machine as claimed in claim 2, wherein
    the at least one machine element is a boom, and
    the at least one range finder device is arranged to the boom, whereby the at least one range finder device is moved together with the boom.

7. The earth moving machine as claimed in claim 3, wherein
    the at least one machine element is a boom, and
    the at least one range finder device is arranged to the boom, whereby the at least one range finder device is moved together with the boom.

8. The earth moving machine as claimed in claim 4, wherein
    the at least one machine element is a boom, and
    the at least one range finder device is arranged to the boom, whereby the at least one range finder device is moved together with the boom.

9. The earth moving machine as claimed in claim 1, wherein
    the range finder device is a laser range finder device, wherein the transmitting unit comprises at least one laser transmitter.

10. The earth moving machine as claimed in claim 2, wherein
    the range finder device is a laser range finder device, wherein the transmitting unit comprises at least one laser transmitter.

11. The earth moving machine as claimed in claim 3, wherein
    the range finder device is a laser range finder device, wherein the transmitting unit comprises at least one laser transmitter.

12. The earth moving machine as claimed in claim 4, wherein
    the range finder device is a laser range finder device, wherein the transmitting unit comprises at least one laser transmitter.

13. The earth moving machine as claimed in claim 5, wherein
    the range finder device is a laser range finder device, wherein the transmitting unit comprises at least one laser transmitter.

14. The earth moving machine as claimed in claim 6, wherein
    the range finder device is a laser range finder device, wherein the transmitting unit comprises at least one laser transmitter.

15. The earth moving machine as claimed in claim 7, wherein
    the range finder device is a laser range finder device, wherein the transmitting unit comprises at least one laser transmitter.

16. The earth moving machine as claimed in claim 8, wherein
    the range finder device is a laser range finder device, wherein the transmitting unit comprises at least one laser transmitter.

17. The earth moving machine as claimed in claim 1, wherein
    the positioning system for determining 3D position and orientation data of the earth moving machine comprises a satellite-based positioning system.

18. The earth moving machine as claimed in claim 1, wherein
    the at least one sensing device for determining position and orientation of the movable machine element comprises at least one Inertia Measurement Unit for producing data on orientation, and
    the control unit is configured to determine orientation of the range finder device in response to the data received from the Inertial Measurement Unit.

19. A range finder arrangement of an earth-moving machine, the arrangement comprising:

at least one range finder device for providing scanning data comprising point cloud of at least one detected object;
means for determining 3D position and orientation of the arrangement; and
at least one control unit configured to receive the detected data and process the received data,
wherein the range finder device is a solid-state device without internal movable mechanical elements, whereby the device is without internal scanning equipment,
the range finder device is arranged on the movable machine element and is configured to be moved together with the movable machine element,
the range finder device is configured to generate the point cloud based on time-of-flight of signals transmitted by a transmitting unit and reflecting signals received by a receiving unit comprising at least one detector, and
the control unit is configured to determine 3D position and orientation of the range finder device and to provide the point cloud with 3D coordinates in response to the input data.

20. A method for 3D scanning at a work site of an earth moving machine, wherein the earth moving machine comprises a carrier and at least one machine element movable relative to the carrier,
the method comprising:
producing scanning data of the surrounding of the earth moving machine by means of at least one range finder device arranged on the earth moving machine, wherein the scanned data comprises at least one point cloud of at least object detected in a field of the range finder device;
determining 3D position and orientation data of the earth moving machine at the work site;
inputting the produced scanned data and the determined position and orientation data to at least one control unit and calculating three-dimensional coordinates for the at least one target point of the produced scanned data;
executing the scanning by means of at least one range finder device being a solid-state device without internal movable mechanical elements and provided with a limited angle of view;
expanding the angle of view of the at least one range finder device being arranged on the movable machine element by moving the range finder device by means of the movable machine element;
determining distance between the range finder device and at least one object by means of time of flight measurement, and inputting the data to the control unit;
determining 3D position and orientation of the range finder device, and inputting the data to the control unit; and
calculating three-dimensional coordinates for the point cloud in response to the input data.

* * * * *